United States Patent
Van et al.

[11] Patent Number: 5,175,079
[45] Date of Patent: Dec. 29, 1992

[54] OPTICAL MEMORY DEVICE

[75] Inventors: Kazuo Van, Nara; Kenji Ohta, Kitakatsuragi; Yoshiteru Murakami, Nishinomiya, all of Japan

[73] Assignee: Sharp Kabushiki Kaisha, Osaka, Japan

[21] Appl. No.: 750,890

[22] Filed: Aug. 26, 1991

[30] Foreign Application Priority Data

Aug. 28, 1990 [JP] Japan .................. 2-227620

[51] Int. Cl.⁵ .................. G11B 7/24
[52] U.S. Cl. .................. 430/338; 430/19; 430/332; 430/343; 430/270; 430/495; 430/945; 430/962
[58] Field of Search .......... 430/338, 19, 270, 335, 430/906, 495, 962, 284, 945, 342, 343, 332; 346/135.1

[56] References Cited

U.S. PATENT DOCUMENTS 4,837,063  6/1989  Irie ........................ 428/64
4,857,438  8/1989  Loerzes et al. ............ 430/332

FOREIGN PATENT DOCUMENTS 1-008092  1/1989  Japan ...................... 430/19
64-087684  3/1989  Japan ..................... 430/962

OTHER PUBLICATIONS

Copy of Patent Abstracts of Japan, vol. 13, No. 293 (C615)(3641) Jul. 1989 (JP-A-1 087684, Mar. 1989).
Copy of Patent Abstracts of Japan, vol. 12, No. 501 (C556) (3348) Dec. 1988 (JP-A-63210118, Aug. 1988).
European Search Report, Feb. 1991, 91307883.8.

*Primary Examiner*—Charles L. Bowers, Jr.
*Assistant Examiner*—John A. McPherson
*Attorney, Agent, or Firm*—David G. Conlin; Donald R. Castle

[57]  ABSTRACT

An optical memory device comprising:
  a transparent substrate; and
  a recording film deposited on the transparent substrate, the recording film being formed by preparing a composition in which a diarylethene-type photochromic compound is dispersed in an ultraviolet-curing polyurethaneacrylate resin of solventless type and by curing the composition by an ultraviolet ray irradiation.

9 Claims, 2 Drawing Sheets

OPTICAL MEMORY DEVICE

BACKGROUND OF THE INVENTION

1. Field of the Invention

The present invention relates to an optical memory device for recording, erasing, and reproducing information by the light, and more particularly to an optical memory device which is made of a photochromic material as a recording film.

2. Description of the Related Art

In a conventional optical memory device made of a photochromic material, the photochromic material is dispersed in a polymeric binder for use. For example, Japanese Unexamined Patent Publication No. SHO 64-87684 discloses an optical memory device in which a recording film consisting of a polymeric binder with a photochromic material is formed on the substrate. The formation of the recording film is carried out in accordance with the following procedures: First, photochromic materials, such as derivatives of diarylethene, and polymeric binder, such as PMMA (polymethylmethacrylate) or polystyrene, are dissolved or dispersed in an appropriate solvent; the resultant solution is spread on the surface of the glass substrate or the like by spin coating; and then the solvent is evaporated.

However, in the conventional constitution and the formation process of the recording film mentioned above, it needs the solvents in which the photochromic material and the polymeric binder are dissolved. Moreover, it also needs annealing process or like procedure to evaporate the solvent after the solution is spread on the substrate, which makes the film-forming process more complicated.

For the polymeric binder, it is desirable to adopt a material which exhibits excellent weather proof such as a three dimensionally cross-linked polymer. However, the cross-linked polymers cannot be adopted in the conventional constitution because of its insolubility. Consequently, in conventional formation, a photochromic material in the recording film easily deteriorates and shows unsatisfactory photochromic durability.

In order to overcome such the problem, several methods have been proposed, in which an ultraviolet-curing resin is adopted as the polymeric binder. In case that a typical ultraviolet-curing epoxy resin is adopted as the polymeric binder, however, the durability of the photochromic material also deteriorated in short time. For this reason, this method was not available for practical use.

SUMMARY OF THE INVENTION

The present invention thus provides an optical memory device comprising: a transparent substrate; and a recording film deposited on the transparent substrate, the recording film formed by preparing a composition in which a diarylethene-type photochromic compound is dispersed in an ultraviolet-curing polyurethaneacrylate resin of solventless type and by curing the composition by an ultraviolet ray irradiation.

The present invention is based on the discovery that the film of the diarylethene-type photochromic compound in said ultraviolet-curing resin can be formed from a dispersion in easy process and shows stable and reversible photochromic stability over a long term.

The recording film according to the present invention can be obtained by dispersing the said photochromic compound in the said ultraviolet-curing resin, spreading the resultant mixture on the substrate surface, and curing by an ultraviolet ray. Therefore, the recording film can be formed in an easy process without using a solvent.

Moreover, since cross-liking occurs in the curing, the ultraviolet-curing resin has excellent weather proof and protects the photochromic compounds from the outside. Furthermore, since the color of the photochromic compound is not stained by the ultraviolet-curing resin, it shows excellent stability over a long period of time.

DETAILED DESCRIPTION OF THE PREFERRED EMBODIMENTS embodiment

An embodiment of the present invention will be described below with reference to FIGS. 1 to 4.

Figure 1:
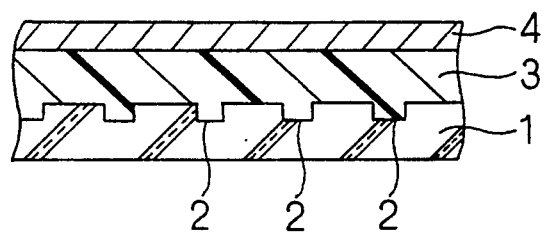
FIG. 1 is a vertical section showing the constitution of an optical memory device of the embodiment.

As shown in FIG. 1, an optical memory device of the present invention comprises a transparent substrate 1 with groove guides 2 formed in a convexo-concave pattern on one side thereof, a recording film 3 deposited on the side of the substrate on which the groove guides 2 are formed, and a reflecting film 4 deposited on the surface of the recording film 3. The recording film 3 consists of an ultraviolet-curing resin in which a photochromic compound is dispersed.

The diarylethene-type photochromic compound is adopted as the said photochromic compound, while an ultraviolet-curing polyurethaneacrylate resin is adopted as the ultraviolet-curing resin. The substrate 1 is made of glass or plastics such as PC (polycarbonate).

The diarylethene-type photochromic compounds mentioned above are compounds represented by the following formula (I) or (II):

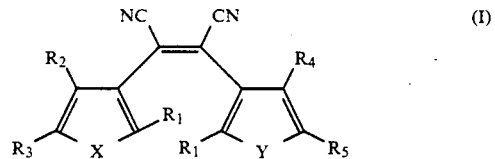

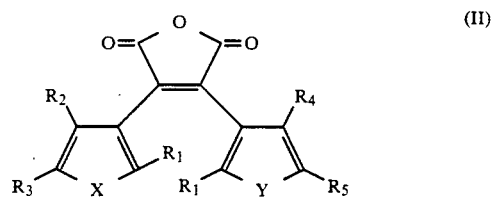

wherein each of X and Y represents $-NR_6-$ ($R_6$ is a lower alkyl group) or a sulfur atom; $R_1$ represents a lower alkyl; each of $R_2$, $R_3$, $R_4$, and $R_5$ may represent a lower alkyl, or a $R_2$ and $R_3$ or $R_4$ and $R_5$ together with the carbon atoms to which they are bonded may form a phenyl. The said lower alkyl has preferably 1 to 3 carbon atoms, among which a methyl is most preferable. It is possible to adopt a well-known adhesive of solventless type as the said ultraviolet-curing polyurethaneacrylate resin. An example of the resin is prepared by adding a photopolymerization initiator (e.g. benzyl, benzoin, and acetophenone) to a polyfunctional prepolymer which is obtained from the reaction of a polyisocyanate compound with an acrylate having a hydroxyl and which forms the main component of the resultant resin. The compound (I) or (II) can be easily prepared in accordance with the known methods. A representative of the compound (I) is URETHANEACRYLATE SD-301 (available from DAINIPPON INK, Inc.: JAPAN). The combination use of the compound (I) and the compound (II) is also possible.

The content of the said diarylethene-type photochromic compound in the recording film is preferably 5 to 50 wt. %. The thickness of the recording film is preferably 1 to 20 μm.

An embodiment will be described below in which 1,2-di(2,3,5-trimethylthienyl)-1,2-dicyanoethene represented by the following formula:

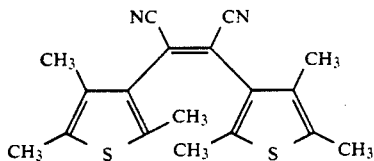

is adopted as the diarylethene-type compounds, while URETHANEACRYLATE SD-301 is adopted as the ultraviolet-curing resin.

Figure 2:
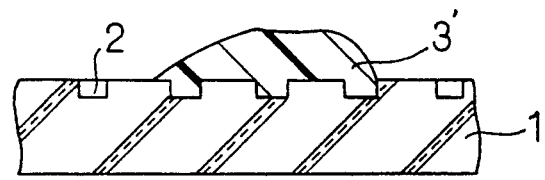
FIGS. 2(a) to 2(c) are views illustrating the process of forming the recording film.
Figure 2:
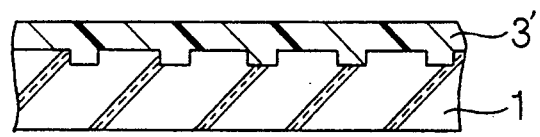
Figure 2:
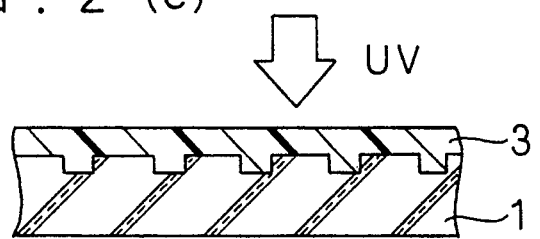

FIG. 2 illustrates the process of forming the recording film 3.

At first, the diarylethene represented by said formula was mixed with said ultraviolet-curing resin at a weight ratio of 1:10, and stirred under a weak violet ray irradiation. Then, as shown in FIG. 2(a), the resultant mixture 3' was added dropwise to the surface of the glass substrate 1 on which the groove guides 2 were formed while the glass substrate 1 was rotating at 2000 rpm, and accomplished spin coating (FIG. 2(b)). Next, the ultraviolet-curing resin was cured by an ultraviolet ray irradiation (UV light in FIG. 2(c)) from an ultra-high pressure mercury lamp as a light source, so that the recording film 3 consisting of the diarylethene dispersed in the ultraviolet-curing resin was formed on the glass substrate 1 (FIG. 2(c)). The thickness of the substrate 1 was ca. 1.2 mm, while the thickness of the recording film 3 was about 50 μm.

As described above, a solvent is not inevitably necessary for forming the recording film 3 in the present embodiment. The formation of the recording film 3 was merely completed by applying the ultraviolet ray, thus providing easy film-forming process.

Figure 3:
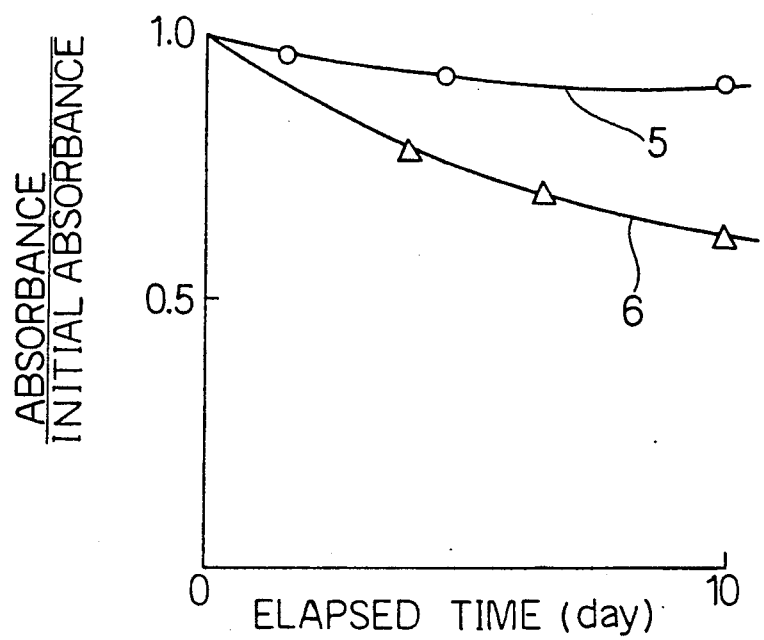
FIG. 3 is a scheme showing the ratio of the absorbance in the dark at 80° C. to the initial absorbance plotted against elapsed time (day).
Figure 4:
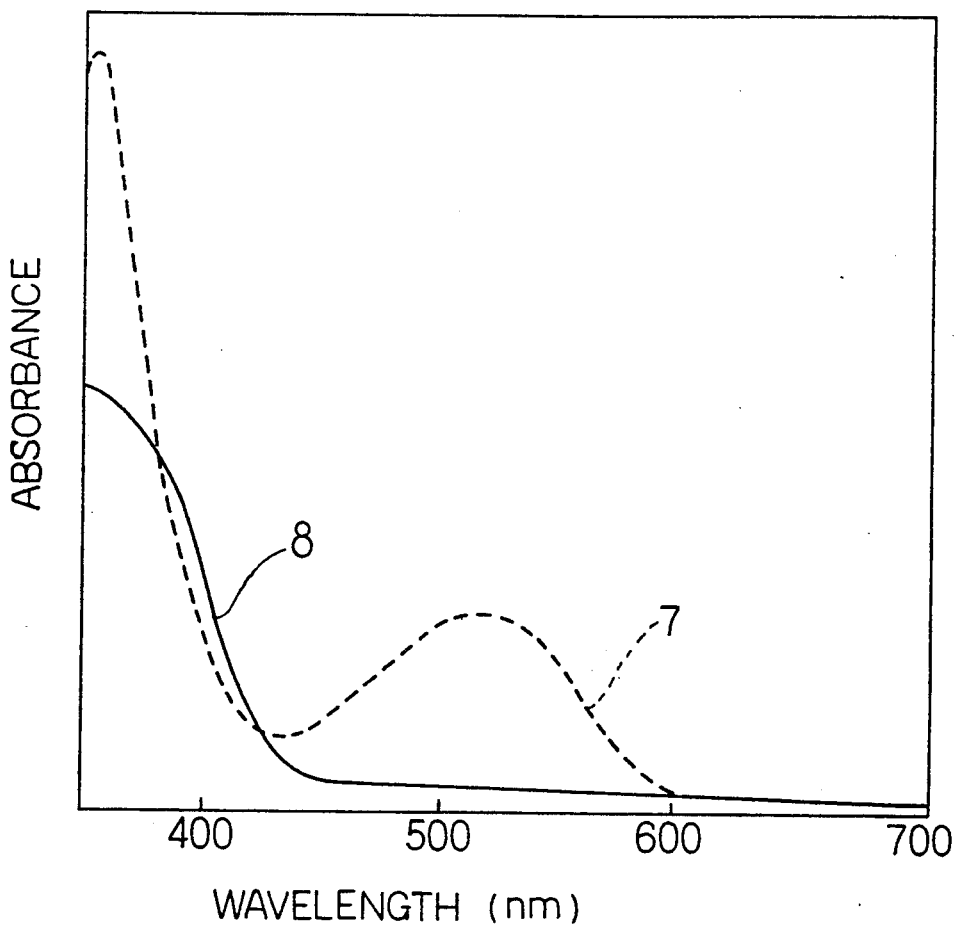
FIG. 4 is a view showing the absorption spectrum of diarylethene in which the absorbance changes in response to the applied light.

The recording film 3 thus obtained was red and its absorption peak was at 525 nm, as shown in the absorbance curve 7 in FIG. 4. In order to examine the color stability, the wavelength change of said peak absorption was measured in the dark at 80° C. for 10 days. Then, the peak ratio of the obtained to the initial was plotted against elapsed time (day) to show the curve 5 in FIG. 3.

On the other hand, another sample of the conventional constitution was prepared for comparison. The control sample was composed of diarylethene dispersed in PMMA. The absorbance of the control sample was measured under the same conditions as described above. The curve 6 in FIG. 3 was obtained from the results of the measurement.

Said control sample was prepared in accordance with the following procedures.

Said diarylethene was mixed with PMMA having the average molecular weight of 12000 at a weight ratio of 1:10. The mixture was then added to acetone as a solvent, and stirred under a weak ultraviolet ray irradiation. After that, the resulting dispersed solution was added dropwise to the surface of the glass substrate on which the groove guides are formed while the glass substrate was rotating at ca. 2000 rpm, and thus accomplished spin coating. The acetone was then evaporated at ca. 70° C., so that the recording film consisting of diarylethene dispersed in PMMA was formed on the glass substrate. The control sample thus obtained was originally colorless, but it was turned into the colored state by an ultraviolet ray irradiation, so that the change in absorbance thereof was measured in the same manner as described above.

It is apparent from FIG. 3 that while the absorbance of the control sample decreased until ca. 60% of the initial absorbance after 10 days, the absorbance of the present embodiment maintained ca. 90% level of the initial absorbance after 10 days, thereby showing the remarkably improved color stability.

The reason for this may be attributed to the satisfactory weather proof of the ultraviolet-curing resin adopted in the sample of the present embodiment; that is, cross-linking occured in the ultraviolet-curing at cure and thereby realizes a more compact structure in the ultraviolet-curing resin, which in turn protects the photochromic material from ambient moisture. Consequently, the photochromic material in the recording film 3 is not easily deteriorated and shows the improved color stability as a result.

After the recording film 3 is formed on the substrate 1, the reflecting film 4 (FIG. 1) is deposited on the recording film 3 by vapor deposition. The reflecting film 4 is made of, for example, Al or Au.

In the above-mentioned constitution, the photochromic material contained in the recording film 3 reversibly changes between the colorless and colored states by the application of light from the side of the substrate 1. For example, when the diarylethene in the colorless state (the absorbance curve 8 of FIG. 4) is irradiated with an ultraviolet ray at about 400 nm, it changes into the colored state (the absorbance curve 7 of FIG. 4). Conversely, when the diarylethene in the colored state is irradiated with a visible light beam at about 525 nm, it changes into the colorless state again.

Hence, at first photochromic material is irradiated with a visible light beam, which is applied to the entire surface of said optical memory device, so as to show colorless. After that, an ultraviolet ray is applied to said surface, irradiated portion of said surface changes into the colored state according to the information and thereby the information can be recorded. Conversely, if a weak visible light beam is applied so that the photochromic material can not change into the colorless state and then the absorbance is measured from the reflected light, the information can be reproduced.

Said constitution is provided with the reflecting film 4, so that the radiated light passes through the recording film 3 twice. As a result, the thickness of the recording film 3 in reflection type can be reduced to about half in comparison with that of transmission type. Besides, since an optical system may be provided only on the side of the substrate 1, the compact optical system can be realized in the optical memory device.

Moreover, because the substrate is provided with the groove guides 2, information can be recorded and reproduced along the groove guides 2. As for tracking, well-known techniques used in a compact disc or the like can be applied thereto.

In the above embodiment, the optical memory device of one-sided structure has been described. However, it is also possible to constitute an optical memory device of double-sided structure by joining two optical memory devices of one-sided structure into an integral body so that the reflecting film 4 of one device is opposed to that of the other device. The optical memory device of the present embodiment is also applicable not only to a disc-shaped optical disc but also to a rectangular optical card. Alternatively, the optical memory device of the present embodiment may be used as transmission type in which the reflecting film 4 is omitted.

It is also possible to form a protective film or a moisture-impermeable film on the recording film or said reflecting film of the present invention. For example, an inorganic film of $SiO_2$, SiN or AlN, or a moisture-impermeable film of resin may be formed on the recording or reflecting film. Alternatively, an anti-static film may be formed thereon.

What we claimed is:

1. An optical memory device comprising:

a transparent substrate; and a recording film, deposited on the transparent substrate, the recording film consisting essentially of an ultraviolet cured dispersion of a diarylethene photochromic compound in an ultraviolet curable polyurethaneacrylate resin, wherein the diarylethene photochromic compound is a compound represented by the following formula (I) or (II):

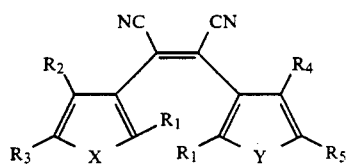

(I)

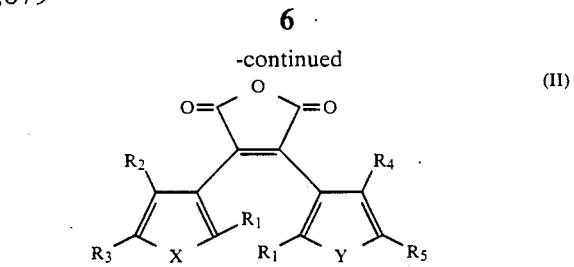

(II)

wherein each of X and Y represents a sulfur atom or $-NR_6$ and $R_6$ is a lower alkyl; $R_1$ represents a lower alkyl; each of $R_2$, $R_3$, $R_4$ and $R_5$ can be a lower alkyl or a combination of $R_2$ with $R_3$ or a combination of $R_4$ with $R_5$ can be phenyl.

2. The optical memory device according to claim 1 wherein the diarylethene photochromic compound is a compound represented by the following formula (I)

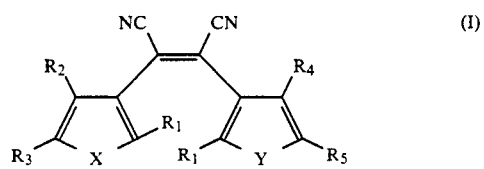

(I)

wherein each of X and Y represents a sulfur atom or $-NR_6$ and $R_6$ is a lower alkyl; $R_1$ represents a lower alkyl; each of $R_2$, $R_3$, $R_4$ and $R_5$ can represent a lower alkyl or a combination of $R_2$ with $R_3$ can represent phenyl or a combination of $R_4$ with $R_5$ can represent phenyl.

3. The optical memory device according to claim 1, wherein the content of the diarylethene-type photochromic compound in the recording film is 5 to 50 wt. %.

4. The optical memory device according to claim 1, wherein the thickness of the recording film is 1 to 20 μm.

5. The optical memory device according to claim 1, wherein the transparent substrate is made of glass or polycarbonate.

6. The optical memory device according to claim 1, wherein a film for reflecting light is formed on the recording film.

7. The optical memory device according to claim 1, wherein the diarylethene type photochromic compound is 1,2-di(2,3,5-trimethylthienyl)-1,2-dicyanoethene represented by the following formula:

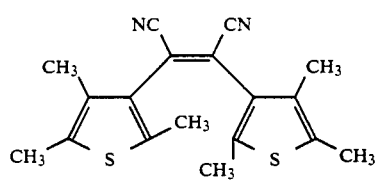

8. An optical memory device according to claim 1 wherein the transparent substrate contains groove guides for receiving the recording film.

9. An optical memory device according to claim 8 wherein the transparent substrate has the recording film deposited on one side.